UNITED STATES PATENT OFFICE.

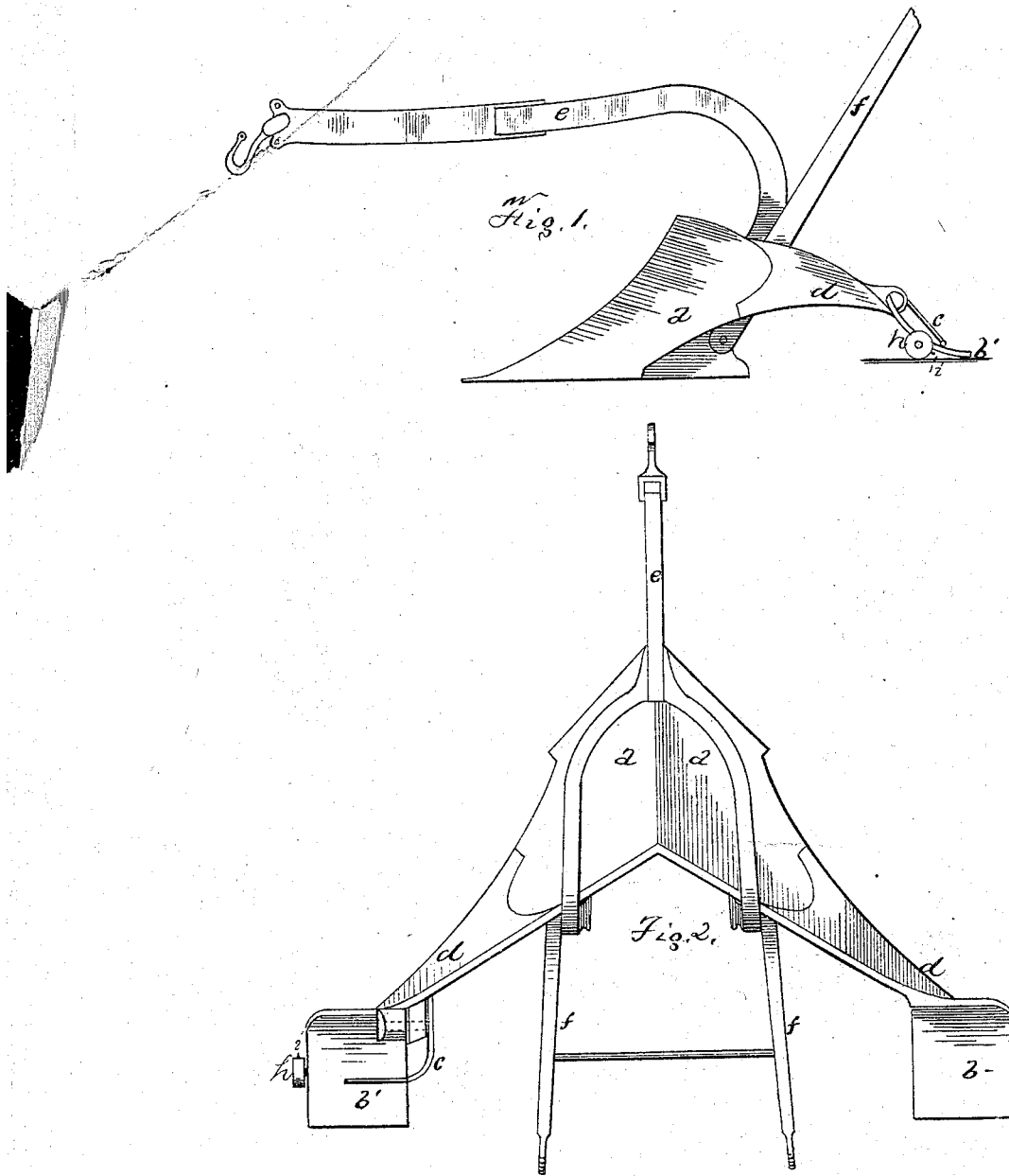

THOMAS J. CLARK AND GEORGE M. CLARK, OF HIGGANUM, CONN.

IMPROVEMENT IN PLOWS.

Specification forming part of Letters Patent No. 137,060, dated March 25, 1873.

*To all whom it may concern:*

Be it known that we, THOMAS J. CLARK and GEORGE M. CLARK, of Higganum, in the county of Middlesex and State of Connecticut, have invented certain new and useful Improvements in Hilling or Ridging Plows, of which the following is a specification, reference being had to the accompanying drawing, in which—

Figure 1 is a side view or elevation of the same. Fig. 2 is a top or plan view of the same.

The invention consists in attachments in the shape of lateral wings for the backward or rear extremities of the mold-boards, either permanent or detachable, for the purpose of smoothing and flattening the tops of the hills or ridges thrown up by the plow. The invention further consists in the attachment to such lateral wings of rollers which have projections on their peripheries for marking holes for planting.

Referring to the drawing, the letter $a$ indicates the body of a hilling or ridging plow, turning the earth both ways, as is requisite for a hilling-plow. To the rear extremities of the mold-boards are attached wings $b$ $b'$, which ride upon the tops of the ridges thrown up by the plow and flatten down and smooth the tops of the ridges, leaving them in good condition for the subsequent planting operations. The wing $b$ is shown as being rigidly attached to the mold-board, and such rigid attachment will answer the end aimed at in some degree. We prefer, however, to pivot the wing to the body of the plow, as we have shown in attaching the wing $b'$, the wing being pressed downward by the spring $c$, this spring allowing the wing to give upwardly when it comes in contact with a stone or other obstruction. The downward play of the wing may be limited by the end or tip of the mold-board projecting underneath the pivoted wing.

Although it is customary to make hilling-plows double-sided, so as to throw up ridges on both sides, still our invention is as well applicable to a single plow throwing up a ridge on one side only, we in that case using but one wing, of course. To the sides of these wings may be attached marking-rolls $h$, which run on the top of the ridges and mark holes for planting by means of one or more pins, $i$, projecting from the face of the roll, which come around at regular intervals and make holes in the soil.

We claim as our invention—

1. A plow with either single or double mold-board, having a wing or wings, $b$ $b'$, either rigidly fastened thereto or pivoted thereto and pressed upon by a spring, all constructed, arranged, and designed to operate substantially as described, for the purpose set forth.

2. The combination of the plow with single or double mold-board, the wing or wings $b$ $b'$, and the marking roll or rolls attached to the wings, the whole constructed, arranged, and designed for operation, substantially as and for the purpose set forth.

THOMAS J. CLARK.
GEORGE M. CLARK.

Witnesses:
S. G. NORTH,
HENRY H. BRAINARD.